Oct. 24, 1950 D. F. BOWMAN 2,526,846

IMPEDANCE-TRANSFORMING ARRANGEMENT

Filed March 12, 1947 2 Sheets-Sheet 1

INVENTOR.
DAVID F. BOWMAN

BY John A. Harvey

ATTORNEY

Oct. 24, 1950 D. F. BOWMAN 2,526,846

IMPEDANCE-TRANSFORMING ARRANGEMENT

Filed March 12, 1947 2 Sheets-Sheet 2

INVENTOR.
DAVID F. BOWMAN

BY John A. Harvey

ATTORNEY

Patented Oct. 24, 1950

2,526,846

UNITED STATES PATENT OFFICE 2,526,846

IMPEDANCE-TRANSFORMING ARRANGEMENT

David F. Bowman, Bayside, N. Y., assignor, by mesne assignments, to the United States of America as represented by the Secretary of the Navy Application March 12, 1947, Serial No. 734,254

5 Claims. (Cl. 178—44)

Figures 1, 2:
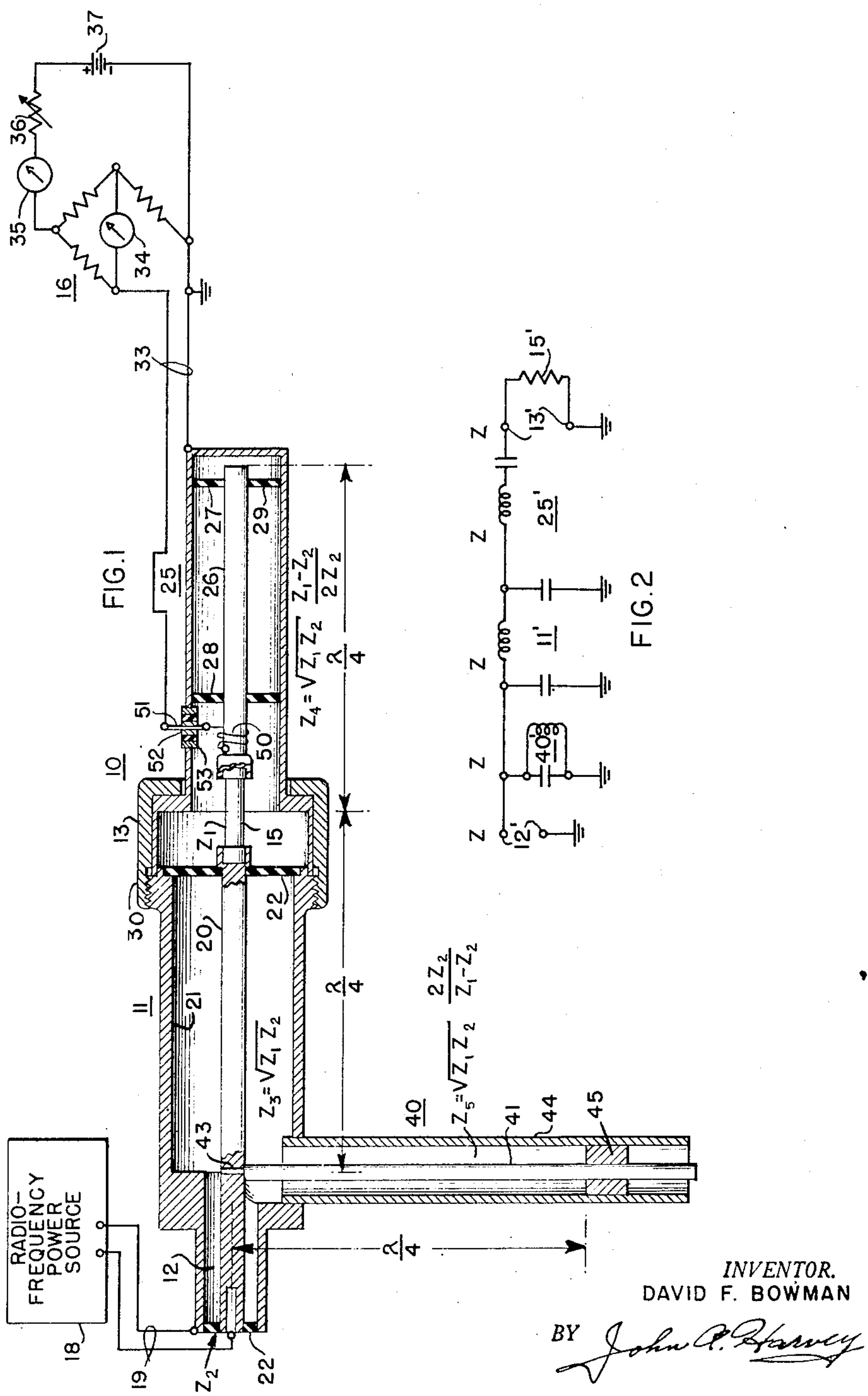

The present invention is directed to arrangements for effectively transforming one impedance of predetermined magnitude and phase to another impedance of predetermined magnitude and phase over a wide range of frequencies.

Arrangements adapted for operation over a relatively wide band of frequencies for transforming an impedance of one characteristic to an impedance of another characteristic have not been entirely satisfactory. By the expression "relatively wide band of frequencies" is meant a band having a width which is a substantial fraction, for example about 10%–50% of the mean operating frequency of the arrangement. In general, arrangements of the character under consideration have afforded an exact impedance match or transformation at but a single frequency or a few frequencies in the band and only a very approximate match at other frequencies within a rather narrow band of frequencies. Accordingly such arrangements are not suitable for those wide-band applications wherein accuracy is important. High-frequency impedance-transforming devices usually employ one or more quarter-wave-length transmission-line sections. These have been connected in a variety of combinations and most of them have been subject to the shortcomings mentioned above. However, a properly designed group of series-connected quarter-wave-length transmission-line sections which, by their overall action, effectively function as a tapered transmission line, afford a suitable impedance transformation over a relatively wide band of frequencies. While the operation of such an arrangement is satisfactory, the length thereof is excessive for most purposes due to the number of transmission-line sections which are required. Thus an arrangement of this character is often impractical for the longer wave-length applications.

It is an object of the invention, therefore, to provide a new and improved impedance-transforming arrangement for operation over a relatively wide band of frequencies which avoids one or more of the above-mentioned disadvantages and limitations of prior such arrangements.

It is another object of the invention to provide a new and improved arrangement for effectively transforming an impedance of predetermined magnitude and phase to another impedance of predetermined magnitude and phase over a relatively wide range of frequencies.

It is a further object of the invention to provide a new and improved impedance-transforming arrangement which is compact in construction and adapted for use over a relatively wide band of frequencies.

It is an additional object of the invention to provide an impedance-transforming arrangement, the principle of construction of which is adapted for application to low-frequency impedance-transforming arrangements as well as to high-frequency impedance-transforming devices.

In accordance with the invention an impedance-transforming arrangement for operation over a relatively wide range of frequencies and for effectively transforming a first impedance of predetermined magnitude and phase to a second impedance of predetermined magnitude and phase comprises, an impedance-inverting wave-signal translating means including a high-impedance end and a low-impedance end for transforming the first impedance to the second impedance at the mid-band frequency of the above-mentioned range. The arrangement also includes a first wave-signal translating means resonant at the mid-band frequency and current coupled with the arrangement at the high-impedance end of the impedance-inverting means. The impedance-transforming arrangement additionally includes a second wave-signal translating means resonant at the mid-band frequency and voltage coupled with the arrangement at the low-impedance end of the impedance-inverting means.

For a better understanding of the present invention, together with other and further objects thereof, reference is had to the following description taken in connection with the accompanying drawings, and its scope will be pointed out in the appended claims.

Figure 4:
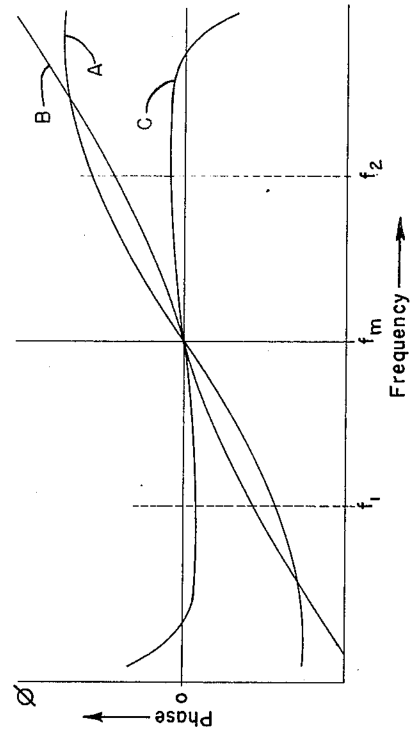
Figure 3:
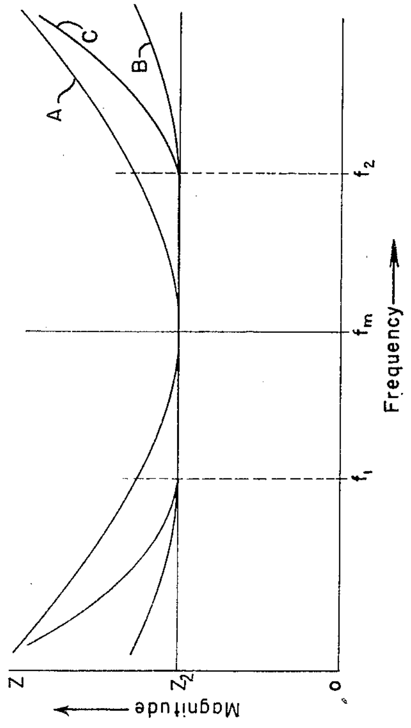
Figure 5:
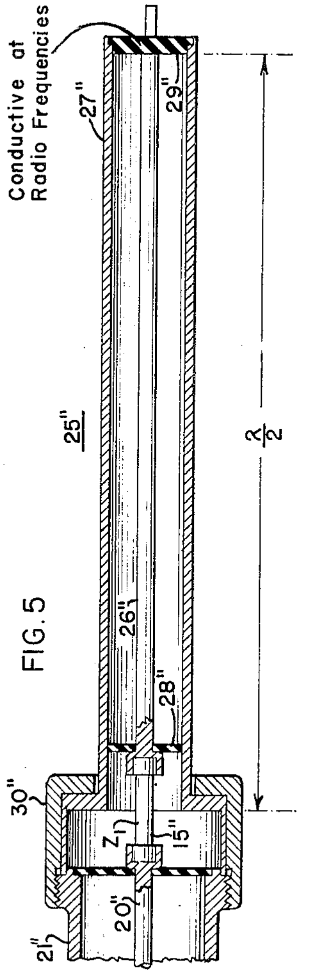

Referring now to the drawings, Fig. 1 is a longitudinal sectional view of an impedance-transforming arrangement in accordance with the invention connected in a circuit for measuring radio-frequency power; Fig. 2 is an equivalent circuit diagram of the impedance-transforming arrangement of Fig. 1; Figs. 3 and 4 are graphs utilized in explaining the operation of the arrangement of Fig. 1; and Fig. 5 is a sectional view of a portion of a modified impedance-transforming arrangement.

Referring now more particularly to Fig. 1 of the drawings, there is illustrated an impedance-transforming arrangement 10 which is adapted for use in connection with the making of radio-frequency power measurements over a relatively wide range of frequencies. The impedance-transforming arrangement comprises an impedance-inverting wave-signal translating means, specifically a quarter-wave-length coaxial transmission-line section 11 including a high-impedance end 13 and a low-impedance end 12, for transforming a first impedance $Z_1$ to a second impedance $Z_2$ at the mid-band frequency of the aforementioned relatively wide range of frequencies. For maximum band width the transmission-line section 11 has a length of one quarter-wave length although for narrower band-width applications this length may be an odd multiple of one quarter-wave length. The impedance $Z_1$ preferably comprises a wire resistor 15 which is similar to an electrical fuse in appearance and constitutes one arm of a power-measuring Wheatstone bridge 16. The latter will be described in greater detail subsequently. The impedance $Z_2$ comprises the conductor or terminating portion at the low-impedance end 12 of the impedance-transforming arrangement 10 and is proportioned in the well-known manner to match the characteristic impedance of a radio-frequency power source 18 which is connected thereto by a suitable transmission line 19. The impedance-inverting transmisison-line section 11 has a characteristic impedance $Z_3$ which is the geometric mean of the high impedance $Z_1$ and the low impedance $Z_2$. This characteristic impedance is established in the conventional manner by a proper proportioning of the diameters of the inner and the outer conductors 20 and 21, respectively, of transmission-line section 11. The inner conductor 20 is supported within the hollow outer conductor 21 at the ends thereof by means of a pair of insulating discs 22, 22.

The impedance-transforming arrangement 10 also includes a first wave-signal translating means which is series-resonant at the above-mentioned mid-brand frequency and effectively has a characteristic impedance $Z_4$ that is proportional to the difference between the impedance $Z_1$ and the impedance $Z_2$. Specifically this means comprises a quarter-wave coaxial transmission-line section 25. The impedance of transmission-line section 25 is also inversely proportional to twice the impedance $Z_2$ and is current coupled with the arrangement 10 at the high-impedance end 13 of the impedance-inverting transmission-line section 11. Transmission-line section 25 includes an inner conductor 26 which is supported within a hollow outer conductor 27 by means of insulating discs 28 and 29, both of which afford a high impedance to high-frequency wave signals. The end of the inner conductor 26 which is connected to the wire resistor 15 has attached thereto a quarter-wave-length radio-frequency choke winding 50, the free end of which is connected to a conductor 51 which comprises the inner terminal of a button-type condenser 52 which is mounted within a suitable bore 53 in the outer conductor 27 of the coaxial transmission-line section 25. Condenser 52 is effective to offer a low-impedance path for high-frequency wave signals. Adjacent ends of the conductors 20 and 26 are conditioned detachably to engage opposite ends of the resistor 15. One end of the outer conductor 27 of the transmission-line section 25 is provided with a rotatable, internally threaded, annular flanged member 30 which is adapted to engage an externally threaded portion of the outer conductor 21 at the high-impedance end 13 of the impedance-inverting section 11.

The inner terminal 51 and the outer conductor 27 of the quarter-wave transmission-line section 25 are connected by a suitable transmission line 33 to a pair of terminals of the Wheatstone bridge 16 so that the resistor 15 forms one arm of the bridge. A meter 34 is connected between one set of diagonally opposite terminals while an ammeter 35, an adjustable resistor 36, and a battery 37 are connected in series between the other set of diagonally opposite terminals.

A second wave-signal translating means, more particularly a quarter-wave coaxial transmission-line section 40 that is parallel-resonant at the mid-band frequency and has a characteristic impedance $Z_5$ which is inversely proportional to that of the first coaxial transmission-line section 25, is voltage coupled with the impedance-transforming arrangement at the low-impedance end 12 of the impedance-inverting section 11. Specifically, one end of the inner conductor 41 of the transmission-line section 40 is conductively connected to the inner conductor 20 by a pin and bore arrangement 43 and the other end thereof is supported within the outer conductor 44 by means of an adjustable short-circuiting plug 45.

The proportioning factors mentioned above in connection with the transmission-line sections 40 and 25 are identical and are equal to the characteristic impedance of the impedance-inverting section 11. Thus the characteristic impedance $Z_3$ of the impedance-inverting section 11 may be expressed by the relation:

$$Z_3=\sqrt{Z_1Z_2} \qquad (1)$$

The characteristic impedance of the transmission-line section 25 may be expressed by the relation:

$$Z_4=\sqrt{Z_1Z_2}\frac{Z_1-Z_2}{2Z_2} \qquad (2)$$

and that of the quarter-wave transmission-line section 40 by the expression:

$$Z_5=\sqrt{Z_1Z_2}\frac{2Z_2}{Z_1-Z_2} \qquad (3)$$

Considering now the operation of a power-measuring system as a whole, the radio-frequency power source 18 is first disconnected from the impedance-transforming arrangement 10. Resistor 15 is connected to the Wheatstone bridge 16 by way of a direct-current path comprising the inner conductors 26, 20, 41, the short-circuiting plug 45, the outer conductors of the transmission-line sections 40, 11, and 25, winding 50, terminal 51, and the transmission line 33. The direct-current portion of the power-measuring system is adjusted by way of the adjustable resistor 36 for a blaanced bridge condition which is indicated by meter 34. The magnitude of the current indicated by the ammeter 35 is noted. The circuit is then re-established between the radio-frequency power source 18 and the impedance-inverting section 10 so that an unknown quantity of radio-frequency power may be introduced into the resistor 15 in the direct-current portion of the system mentioned above. The radio-frequency connections through the resistor 15 are completed by way of the transmission line 19, the inner and outer conductors 20 and 21, respectively, and the low-impedance path through the condenser 52 to the inner conductor 26 at the input end of the quarter-wave-length open-circuited transmission-line section 25. The introduction of radio-frequency energy to the resistor 15 causes a change in the resistor impedance which is effective to upset the balance of the Wheatstone bridge 16. The resistor 36 is then readjusted so that the meter 34 indicates a balanced condition whereupon the new indication afforded by the ammeter 35 is noted. The difference in the first and the second direct-current readings of the ammeter 35 is utilized in connection with the value of the resistor 15 to determine the magnitude of the applied radio-frequency power. When power measurements are required at other frequencies, the frequency of the output signal of the power source 18 is adjusted and additional measurements are made in the manner described above. Since the arrangement 10 effectively transforms the high impedance $Z_1$ of the resistor 15 to that of the low impedance $Z_2$ at the radio-frequency input end of the arrangement over a wide range of frequencies, losses in the arrangement 10 are minimized so that substantially all the applied power is absorbed by the resistor 15, thus permitting the Wheatstone bridge 16 accurately to measure the radio-frequency power over the aforesaid relatively wide range of frequencies.

Considering now the transformation of the first impedance $Z_1$ to the second impedance $Z_2$ over a relatively wide range of frequencies, reference is made to Fig. 2 of the drawings for the equivalent circuit diagram of the impedance-transforming arrangement which is illustrated in Fig. 1. Portions of the Fig. 2 schematic diagram which correspond to similar elements in the Fig. 1 arrangement are designated by the same reference characters primed and, for convenience, the characteristic impedances of these various portions are indicated adjacent thereto. Equivalents for the condenser 52 and the winding 50 do not appear in Fig. 2 since these elements do not contribute to the impedance-transforming properties of the arrangement. The distributed inductances and capacitances of the short-circuited transmission-line section 40 may be represented by their lumped circuit equivalents which comprise a parallel-resonant circuit 40′. Similarly, the quarter-wave-length open-circuit transmission-line section 25 may be represented by a series-resonant circuit 25′. The impedance-inverting transmission-line section 11 is represented by an equivalent $\pi$ network section 11′. This network constitutes a recognized equivalent section of a transmission line. All three types of the foregoing networks are treated in considerable detail in various texts, for example, "Communication Engineering," second edition, by W. L. Everitt, published in 1937 by the McGraw-Hill Book Company, Inc., at pages 171, 172 and 173 thereof. From the equivalent circuit diagram of Fig. 2 it will be apparent that the transmission-line section 25 of the Fig. 1 embodiment is current coupled with the arrangement while the transmission-line section 40 is voltage coupled therewith at the high-frequency end and the low-frequency end, respectively.

It wil be apparent that the impedance-inverting network 11′ is effective in the well-known manner to transform the magnitude of the impedance $Z_1$ to the impedance $Z_2$ in the way illustrated by the curve A of Fig. 3, which curve represents the magnitude of the impedance observed looking into the low-impedance end 12′ of the arrangement. Thus it will be seen that the two impedances are equal in magnitude at only one frequency of a relatively wide range of frequencies $f_1$—$f_2$, which one frequency corresponds to the mid-band frequency $f_m$. It may be demonstrated that the impedance-inverting network 11′ and the series-resonant network 25′ together have an impedance characteristic, the magnitude of which varies with frequency in a manner represented by curve B of Fig. 3. Thus the networks 11′ and 25′ transform the impedance $Z_1$ to the impedance $Z_2$ insofar as magnitude alone is concerned over the relatively wide frequency range $f_1$—$f_2$. However, another factor must also be taken into consideration, as will be made clear subsequently. The combination of the networks 11′, 25′, and 40′ provide the impedance-magnitude-frequency characteristic represented by curve C. It will be seen that an exact impedance transformation with respect to magnitude is afforded over the range of frequencies $f_1$—$f_2$.

The variations of phase with frequency, which must also be considered in connection with the performance of the impedance-transforming arrangement, are illustrated in Fig. 4 of the drawings. Curves A, B, and C thereof represent the phase-frequency curves for the various network combinations which were mentioned in connection with the corresponding impedance-magnitude-frequency curves A, B, and C of Fig. 3. The phase variation with frequency afforded by the impedance-inverting network 11′ alone is very large, as shown by curve A. While the network sections 11′ and 25′ in combination exhibit a satisfactory transformation with respect to magnitude of impedance over the relatively wide band $f_1$—$f_2$, as represented in curve B of Fig. 3, the phase-frequency characteristic, as illustrated by curve B of Fig. 4, demonstrates that a satisfactory impedance match is not afforded because of the large phase variation. However, the impedance-transforming arrangement including the three network sections 11′, 25′, and 40′ in combination has the phase characteristic illustrated in curve C, which curve is comparatively small-valued over the relatively large frequency range $f_1$—$f_2$. Accordingly the impedance-transforming arrangement which is illustrated in Fig. 1 and represented schematically in Fig. 2 is effective to provide an accurate impedance match over a relatively wide operating range of frequencies $f_1$—$f_2$. Thus it may be seen that the impedance-inverting section 11 provides the desired impedance transformation at the mid-band frequency while the sections 25 and 40 are effective to control the impedance variations at either side of the mid-band frequency.

It is to be understood that if the characteristic impedances of the transmission-line sections of the arrangement of Fig. 1 are proportioned in accordance with the relations previously mentioned, the desired impedance transformation and optimum performance over a relatively wide range of frequencies will result. However, if the characteristic impedances are selected approximately in accordance with these relations, satisfactory performance for many purposes may be procured. Accordingly, it is intended that the scope of the appended claims be interpreted to cover impedance-transforming arrangements which are constructed substantially in accordance with the aforementioned preferred relations.

The following impedance values for the various transmission-line sections of the Fig. 1 arrangement were found to have utility in connection with a structure constructed in accordance with Fig. 1 of the drawings:

| | |
|---|---|
| Impedance $Z_1$ ________________ohms__ | 200 |
| Impedance $Z_2$ ________________do____ | 50 |
| Characteristic impedance $Z_3$ of section 11 ____________________ohms__ | 100 |
| Characteristic impedance $Z_4$ of section 25 ____________________ohms__ | 150 |
| Characteristic impedance $Z_5$ of section 40 ____________________ohms__ | 66.7 |
| Frequency $f_1$ ____________megacycles__ | 750 |
| Frequency $f_m$ ________________do____ | 1050 |
| Frequency $f_2$ ________________do____ | 1350 |

Referring now to Fig. 5 of the drawings, there is illustrated a sectional view of a portion of a modified impedance-transforming arrangement which is similar to the arrangement of Fig. 1, Accordingly, corresponding elements are designated by the same reference numerals double primed. In the Fig. 5 embodiment, the quarter-wave open-circuited transmission line represented in Fig. 1 has been replaced by a half-wave-length short-circuited transmission line 25''. The inner conductor 26'' is supported within the outer conductor 27'' at both ends thereof by a pair of insulating discs 28'' and 29''. Disc 29'' affords a low-impedance path between the inner and outer conductors 26'' and 27'', respectively, for radio-frequency wave signals while presenting a high impedance for unidirectional currents. The conductors 26'' and 27'' at the free end of the half-wave transmission-line section 25'' are adapted to be connected to a Wheatstone bridge in the general manner illustrated in Fig. 1. Since the half-wave short-circuited transmission-line section 25'' effectively constitutes a series-resonant circuit at the mid-band frequency of the arrangement, it will be manifest that the operation of the arrangement constructed in accordance with Fig. 5 will be similar to the operation of the Fig. 1 arrangement, and hence need not be repeated.

An impedance-transforming arrangement in accordance with the invention may include other combinations of lengths of transmission-line sections depending on the particular operating band width which is to be afforded. Longer transmission-line sections afford greater changes in phase angle with frequency and hence narrower operating bands for a given value of impedance change. For optimum performance the reactance of a transmission-line section, such as the section 40 at one of the ends of the impedance-transforming arrangement, should be directly proportional to the susceptance of the transmission-line section 25 at the other end of the arrangement. This result is realized when the transmission-line section at the high-impedance end and the transmission-line section at the low-impedance end of the impedance-transforming arrangement are of equal lengths but of opposite terminating conditions at the remote ends thereof as illustrated in the Fig. 1 embodiment.

From the foregoing description it will be seen that the principle of the impedance-transforming arrangement of the instant invention is not only applicable to high-frequency impedance-transforming arrangements but also to low-frequency devices of this type. It will be apparent from the foregoing explanation that an impedance-transforming arrangement in accordance with the present invention is adapted for operation over a relatively wide range of frequencies to transform a first impedance of predetermined magnitude and phase to a second impedance of predetermined magnitude and phase.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An impedance-matching device for operation over a relatively wide range of frequencies and for effectively matching a first impedance of predetermined magnitude and phase to a second impedance of predetermined magnitude and phase comprising: an impedance-inverting wave-signal translating means including a high-impedance end and a low-impedance end for transforming said first impedance to said second impedance at the mid-band frequency of said range; a first wave-signal translating means series resonant at said mid-band frequency, means connecting said high impedance and said first wave-signal translating means in series across said impedance inverting wave signal translating means at the current loop generated at said high-impedance end of said impedance-inverting means; and a second wave-signal translating means parallel resonant at said mid-band frequency and connected across said impedance inverting means at the voltage loop at said low-impedance end of said impedance-inverting means.

2. An impedance-matching device comprising: an impedance-inverting transmission-line section including a high-impedance end and a low-impedance end for matching a first impedance to a second impedance at the mid-band frequency of a relatively wide range of frequencies; a first quarter-wave-length transmission-line section series-resonant at said mid-band frequency, effectively having a characteristic impedance substantially equal to the product of a proportionality constant and a function which is directly proportional to the difference between said first impedance and said second impedance and inversely proportional to twice said second impedance, means connecting said high impedance in series with said first quarter-wave-length line across said impedance transmission-line section at the current loop generated at said high-impedance end of said impedance-inverting transmission-line section; and a second quarter-wave-length transmission-line section parallel-resonant at said mid-band frequency, effectively having a characteristic impedance substantially equal to the product of a proportionality constant and a function which is inversely proportional to the function of said first quarter-wave-length transmission-line section, coupled with the voltage loop at said low-impedance end of said impedance-inverting transmission-line section; each of the proportionality constants mentioned above being equal to the characteristic impedance of said impedance-inverting transmission-line section; whereby said first and said second transmission-line sections co-operate with said impedance-inverting transmission-line section to cause said first impedance to be matched by said device to said second impedance over said relatively wide range of frequencies.

3. An impedance-matching device comprising: an impedance-inverting coaxial transmission-line section including a high-impedance end and a low-impedance end for matching a first impedance to a second impedance at the mid-band frequency of a relatively wide range of frequencies; a first coaxial transmission-line section series resonant at said mid-band frequency, effectively having a characteristic impedance substantially equal to the product of a proportionality constant and a function which is directly proportional to the difference between said first impedance and said second impedance and inversely proportional to twice said second impedance, means connecting said high impedance in series with said first coaxial transmission line section across said impedance-inverting coaxial transmission line section at the current loop generated at said high-impedance end of said impedance-inverting transmission-line section; and a second coaxial transmission-line section resonant at said mid-band frequency, effectively having a characteristic impedance substantially equal to the product of a proportionality constant and a function which is inversely proportional to the function of said first transmission-line section, coupled with the voltage loop at said low-impedance end of said impedance-inverting transmission-line section; each of the proportionality constants mentioned above being equal to the characteristic impedance of said impedance-inverting transmission-line section; whereby said first and said second transmission-line sections co-operate with said impedance-inverting transmission-line section to cause said first impedance to be matched by said device to said second impedance over said relatively wide range of frequencies.

4. An impedance-matching device comprising: a lumped-constant impedance-inverting network including a high-impedance end and a low-impedance end for matching a first impedance to a second impedance at the mid-band frequency of a relatively wide range of frequencies; a first lumped-constant network series resonant at said mid-band frequency, effectively having a characteristic impedance substantially equal to the product of a proportionality constant and a function which is directly proportional to the difference between said first impedance and said second impedance and inversely proportional to twice said second impedance, means connecting said high impedance in series with said lumped-constant network across said impedance-inverting network at the curent generated at said high-impedance end of said impedance-inverting network; and a second lumped-constant network parallel resonant at said mid-band frequency, effectively having a characteristic impedance substantially equal to the product of a proportionality constant and a function which is inversely proportional to the function of said first network, coupled with the voltage loop generated at said low-impedance end of said impedance-inverting network; each of the proportionality constants mentioned above being equal to the characteristic impedance of said impedance-inverting network; whereby said first and said second networks co-operate with said impedance-inverting network to cause said first impedance to be matched by said device to said second impedance over said relatively wide range of frequencies.

5. An impedance-matching device comprising: an impedance-inverting wave-signal translating means including a high-impedance end and a low-impedance end for matching a first impedance $Z_1$ to a second impedance $Z_2$ at the midband frequency of a relatively wide range of frequencies, said impedance-inverting means having a characteristic impedance $Z_3$ which is the geometric mean of said first and said second impedances $Z_1$ and $Z_2$, respectively; a first quarter-wave-length wave-signal translating means series-resonant at said mid-band frequency, effectively having a characteristic impedance $Z_4$ established in accordance with the relation $$Z_4=\sqrt{Z_1Z_2}\frac{Z_1-Z_2}{2Z_2}$$

and current means connecting said high impedance and said first quarter-wave-length wave-signal translating means in series across said impedance-inverting wave signal translating means at the current loop generated at said high-impedance end of said impedance-inverting means; and a second quarter-wave-length wave-signal translating means parallel-resonant at said mid-band frequency, effectively having a characteristic impedance established in accordance with the relation $$Z_5=\sqrt{Z_1Z_2}\frac{2Z_2}{Z_1-Z_2}$$

coupled with the voltage loop generated at said low-impedance end of said impedance-inverting means; whereby said first and said second wave-signal translating means co-operate with said impedance-inverting means to cause said first impedance $Z_1$ to be matched by said device to said second impedance $Z_2$ over said relatively wide range of frequencies.

DAVID F. BOWMAN.

REFERENCES CITED

The following references are of record in the file of this patent:

UNITED STATES PATENTS

| Number | Name | Date |
|---|---|---|
| 2,149,356 | Mason | Mar. 7, 1939 |
| 2,183,123 | Mason | Dec. 12, 1939 |
| 2,278,251 | Dome | Mar. 31, 1942 |
| 2,284,529 | Mason | May 26, 1942 |
| 2,421,033 | Mason | May 27, 1947 |